United States Patent
Hardwicke, Jr. et al.

(10) Patent No.: US 11,530,685 B2
(45) Date of Patent: Dec. 20, 2022

(54) SYSTEM AND METHOD FOR MANAGING OUTPUT FLICKER GENERATED BY A WIND FARM

(71) Applicant: General Electric Company, Schenectady, NY (US)

(72) Inventors: Edward Wayne Hardwicke, Jr., Greenville, SC (US); Jignesh Govindlal Gandhi, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 16/998,034

(22) Filed: Aug. 20, 2020

(65) Prior Publication Data
US 2022/0056883 A1 Feb. 24, 2022

(51) Int. Cl.
| | | |
|---|---|---|
| *F03D 7/04* | (2006.01) | |
| *F03D 7/02* | (2006.01) | |
| *H02J 3/38* | (2006.01) | |
| *H02J 3/01* | (2006.01) | |

(52) U.S. Cl.
CPC ........... *F03D 7/048* (2013.01); *F03D 7/0284* (2013.01); *H02J 3/01* (2013.01); *H02J 3/381* (2013.01); *H02J 2300/28* (2020.01)

(58) Field of Classification Search
CPC .......... F03D 7/048; F03D 7/0284; H02J 3/01; H02J 2300/28
See application file for complete search history.

(56) References Cited

U.S. PATENT DOCUMENTS

| | | |
|---|---|---|
| 6,924,565 B2 | 8/2005 | Wilkins et al. |
| 7,804,184 B2 | 9/2010 | Yuan et al. |
| 8,774,949 B2 | 7/2014 | Ou |
| 8,821,108 B2 | 9/2014 | Nayebi et al. |
| 9,450,415 B2 | 9/2016 | Larsen et al. |
| 9,458,830 B2 | 10/2016 | Barker et al. |
| 9,831,810 B2 | 11/2017 | Achilles et al. |
| 2005/0253396 A1 | 11/2005 | Mikhail et al. |

(Continued)

FOREIGN PATENT DOCUMENTS

| | | |
|---|---|---|
| EP | 1269282 A1 | 1/2003 |
| WO | WO 01/73518 A1 | 10/2001 |
| WO | WO2012/019331 A1 | 2/2012 |

OTHER PUBLICATIONS

European Search Report for EP Application No. 21191952.7, dated Jan. 31, 2021.

(Continued)

*Primary Examiner* — Joseph Ortega
(74) *Attorney, Agent, or Firm* — Dority & Manning, P.A.

(57) ABSTRACT

A system and method are provided for managing flicker generated by a wind farm. Accordingly, the farm controller detects at least one parameter of the wind farm indicative of an output flicker resulting from a synchronized flicker of at least two turbines of the plurality of wind turbines. Upon detecting the parameter, the farm controller generates a command offset for at least one wind turbine of the at least two wind turbines. An operating parameter of the at least one wind turbine is changed based on the command offset so as to de-synchronize the synchronized flicker in the output signals of the at least two wind turbines.

18 Claims, 7 Drawing Sheets

(56) References Cited

U.S. PATENT DOCUMENTS

| | | | |
|---|---|---|---|
| 2006/0255594 A1 | 11/2006 | Larsen | |
| 2008/0073912 A1* | 3/2008 | Fortmann | ............... F03D 9/257 |
| | | | 290/55 |
| 2019/0305703 A1 | 10/2019 | Holliday et al. | |
| 2021/0115898 A1* | 4/2021 | Messing | ................ F03D 7/048 |

OTHER PUBLICATIONS

Blavette, Anne et al., Impact of a Wave Farm on its Local Grid: Voltage Limits, Flicker Level and Power Fluctuations, IEEE, 2012 Oceans—Yeosu, May 21, 2012, pp. 1-9.

Chen, Y. et al., A Digital Implementation of IEC 61000-4-15 Flickermeter, IEEE Power & Energy Society General Meeting, IEEE, Jul. 26, 2015, pp. 1-5.

Fooladi, Milad et al., Recognition and Assessment of Different Factors Which Affect Flicker in Wind Turbines, IET Renewable Power Generation, 2016, vol. 10, No. 2, The Institution of Engineering and Technology, Feb. 1, 2016, pp. 250-259.

Khan, Noman et al., Evaluation of Flicker Measurement in Grid-connected Wind Turbine, 2018 IEEE PES Asia-Pacific Power and Energy Engineering Conference (APPEEC), IEEE, Oct. 7, 2018, pp. 633-639.

* cited by examiner

SYSTEM AND METHOD FOR MANAGING OUTPUT FLICKER GENERATED BY A WIND FARM

FIELD

The present disclosure relates in general to wind farms, and more particularly to systems and methods for managing output flicker generated by a wind farm having a plurality of wind turbines.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

In many wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

For some wind turbines, it is desirable to modify the torque command of the power converter during operation of the wind turbine as each rotor blade aligns with and passes the tower. This modification, however, can tend to cause undesirable low-frequency voltage variations on the power grid. Such variations are often referred to as flicker. Thus, the term "flicker" as used herein generally refers to variations in current or voltage on the power grid that are perceptible at certain frequencies (e.g. from about 1 Hertz (Hz) to about 30 Hz). Additionally, when the wind turbines are assembled as a wind farm, the flicker of the individual wind turbines, or a portion thereof, may be unintentionally synchronized resulting in an output flicker in the output of the wind farm. Oftentimes, grid requirements prohibit connection to the power grid if flicker is present in a certain amount.

In view of the aforementioned, the art is continuously seeking new and improved systems and methods for managing flicker generated by wind farm.

BRIEF DESCRIPTION

Aspects and advantages of the invention will be set forth in part in the following description, or may be obvious from the description, or may be learned through practice of the invention.

In one aspect, the present disclosure is directed to a method for managing flicker generated by a wind farm connected to a power grid. The wind farm may include a plurality of wind turbines. The method may include detecting, with a farm controller of the wind farm, at least one parameter of the wind farm indicative of an output flicker resulting from the synchronized flicker of at least two wind turbines of the plurality of wind turbines. Upon detecting the parameter(s), the method may include generating a command offset for at least one wind turbine of the two wind turbines. Additionally, the method may include changing an operating parameter of the wind turbine(s) based on the command offset so as to de-synchronize the synchronized flicker in the output signals of the two wind turbines.

In an embodiment, generating the command offset may include generating a random biasing value.

In an additional embodiment, changing the operating parameter of the wind turbine(s) may include introducing the random biasing value into a speed feedback loop of a turbine controller to develop a variable rotor speed for the wind turbine(s).

In a further embodiment, the wind farm may also include at least one output sensor operably coupled to the farm controller at a point of interconnect (POI) with the power grid. Additionally, detecting the parameter(s) indicative of the output flicker may also include monitoring via the output sensor(s) a frequency and amplitude of variations in current or voltage of the output of the wind farm at the point of interconnect with the power grid. The frequency and amplitude of the variations may be indicative of output flicker in the output of the wind turbine(s). The method may also include detecting, with the farm controller, an approach of the output of the output sensor(s) to a flicker threshold for the wind farm.

In yet a further embodiment, the wind farm may include at least one environmental sensor operably coupled to the farm controller. Additionally, detecting the parameter(s) indicative of the output flicker may include monitoring, via the environmental sensor(s), at least one environmental parameter indicative of an environmental condition affecting the wind farm. The method may also include correlating, with the farm controller, the environmental parameter(s) to indicate an of a level of output flicker as detected by the output sensor(s) at the monitored environmental condition.

In an embodiment, the method may include determining, with the farm controller, an output flicker potential for the wind farm based at least in part on the correlation and a forecasted environmental condition.

In an additional embodiment, generating the command offset may include generating the command offset when at least one of the output flicker potential or the output of the output sensor(s) approaches or exceeds the flicker threshold for the wind farm.

In a further embodiment, the method may include determining an impact on the level of output flicker resulting from the changing of the operating parameter of the wind turbine(s) based on the command offset. The method may also include correlating, with the farm controller, the impact with the environmental condition affecting the wind farm. Further, the method may include assigning a synchronicity-impact score to the wind turbine(s) based on the computed correlation for the detected environmental condition. Additionally, the method may include selecting the wind turbine(s) from the plurality of wind turbines to receive the command offset based, at least partially, on the synchronicity-impact score.

In yet a further embodiment, detecting the parameter(s) indicative of the output flicker may include receiving, with the farm controller, a timing signal from the two wind turbines. The timing signal may be indicative of a rotor position for each of the wind turbines. The method may include determining, with the farm controller, a degree of synchronicity amongst the two wind turbines of the plurality of wind turbines based on the respective timing signals. Additionally, the method may include determining, with the farm controller, a difference between the degree of synchronicity and a synchronicity threshold corresponding to an output flicker threshold.

In an embodiment, determining the degree of synchronicity among the plurality of wind turbines may include establishing, with the farm controller, a plurality of time slices. The method may also include determining, with the farm controller, a standard deviation for the timing signals across the time slices. The standard deviation for the timing signals may be indicative of the degree of synchronicity amongst the plurality of wind turbines.

In an additional embodiment, the two wind turbines of the plurality of wind turbines may include at least a first sub-grouping of wind turbines and a second sub-grouping of wind turbines. The timing signal may be indicative of a combined timing of the first and second sub-groupings of wind turbines respectively.

In a further embodiment, changing the operating parameter of the wind turbine(s) based on the command offset may include changing an operating parameter corresponding to at least one of generator torque, power output, rotor speed, or mechanical loading of the wind turbine(s).

In another aspect, the present disclosure is directed to a system for managing flicker generated by the wind farm. The system may include the plurality of wind turbines coupled to the electrical grid. The system may also include the farm controller communicatively coupled to the plurality of wind turbines and to the power grid. The farm controller may include at least one processor configured to perform a plurality of operations. The plurality of operations may include detecting the parameter(s) of the wind farm indicative of an output flicker resulting from the synchronized flicker of two wind turbines of the plurality of wind turbines. Upon detecting the parameter(s), the plurality of operations may include generating the command offset for at least one wind turbine of the two wind turbines. Additionally, the plurality of operations may include changing an operating parameter of the wind turbine(s) based on the command offset so as to de-synchronize the synchronized flicker in the output signals of the two wind turbines. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind farm connected to power grid. In particular, the present disclosure may include a system and method which may facilitate managing flicker occurring in the power grid generated by the wind farm. The flicker may be an output flicker resulting in the output of the wind farm resulting from the unintentional alignment/synchronization of the flicker that may be present in the outputs of the individual wind turbines of the wind farm. Accordingly, the farm controller may detect a parameter of the wind farm which may be indicative of a synchronized flicker of two or more wind turbines of the wind farm. In the various embodiments, the parameter may, for example, include measurements of the flicker, weather conditions, rotor position timing signals, learned wind turbine behaviors, and/or the wind turbine operational state.

In response to detecting the parameter, the farm controller may generate a command offset for at least one of the wind turbines. The command offset may temporarily alter an operating state or parameter of the wind turbine. For example, when the rotors of two wind turbines pass through the six o'clock position at the same time, any flicker in the output of the wind turbines may be synchronized. Upon detecting such a state, the farm controller may direct one of the wind turbines to momentarily change its rotational speed so that the rotors of the two wind turbines pass through the six o'clock position at different instants. In other words, under the present disclosure, one of the wind turbines may, essentially, "skip a beat" so that the rotor positions, or other aspect of the turbines, are de-synchronized. Even though the individual wind turbines may produce an output having flicker, by de-synchronizing the flickers, the combined output of the wind farm delivered to the power grid may not flicker.

Figure 1:
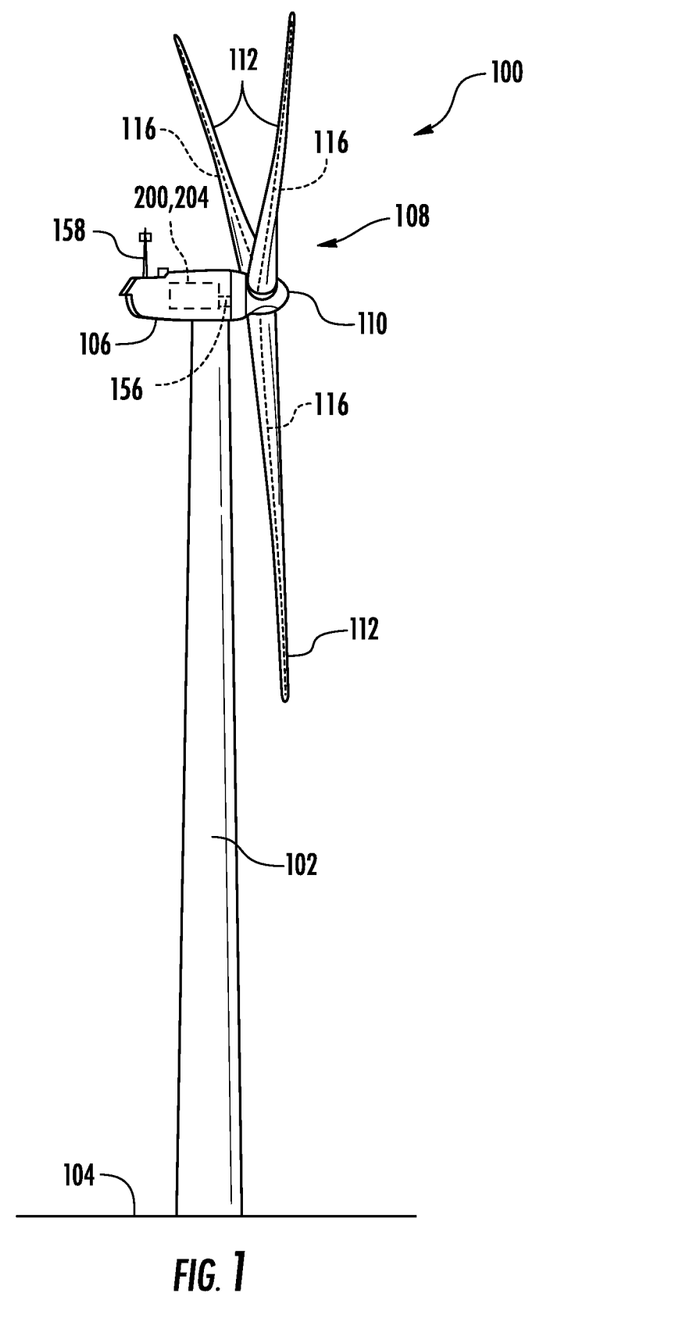
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. The wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

The wind turbine 100 may also include a controller 200 configured as a turbine controller 204. The controller 200 may be centralized within the nacelle 106. However, in other embodiments, the controller 200 may be located within any other component of the wind turbine 100 or at a location outside the wind turbine 100. Further, the controller 200 may be communicatively coupled to any number of the components of the wind turbine 100 in order to control the components. As such, the controller 200 may include a computer or other suitable processing unit. Thus, in several embodiments, the turbine controller 204 may include suitable computer-readable instructions that, when implemented, configure the controller 200 to perform various different functions, such as receiving, transmitting and/or executing wind turbine control signals.

Still referring to FIG. 1, one or more sensors 156, 158 may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine the condition of the wind turbine 100. For example, as shown, each of the wind turbines 100 may include an environmental sensor 158 configured for gathering data indicative of at least one environmental condition. The environmental sensor 158 may be operably coupled to the controller 200. Thus, in an embodiment, the environmental sensor(s) 158 may, for example, be a wind vane, an anemometer, a lidar sensor, thermometer, barometer, or other suitable sensor. The data gathered by the environmental sensor(s) 158 may include measures of wind speed, wind direction, wind shear, wind gust, wind veer, atmospheric pressure, and/or temperature. In at least one embodiment, the environmental sensor(s) 158 may be mounted to the nacelle 106 at a location downwind of the rotor 108. The environmental sensor(s) 158 may, in alternative embodiments, be coupled to, or integrated with, the rotor 108. It should be appreciated that the environmental sensor(s) 158 may include a network of sensors and may be positioned away from the wind turbines 100.

In addition to the environmental sensor(s) 158, the wind turbines 100 may also include one or more asset condition sensors 156. The asset condition sensor(s) 156 may, for example, be configured to monitor electrical properties of the output of the generator of each of the wind turbines 100, such as current sensors, voltage sensors temperature sensors, or power sensors that monitor power output directly based on current and voltage measurements. In at least one embodiment, the asset condition sensor(s) 156 may include any other sensors that may be utilized to monitor the operating state of the wind turbines 100, such as rotor position and/or rotor timing.

Figure 2:
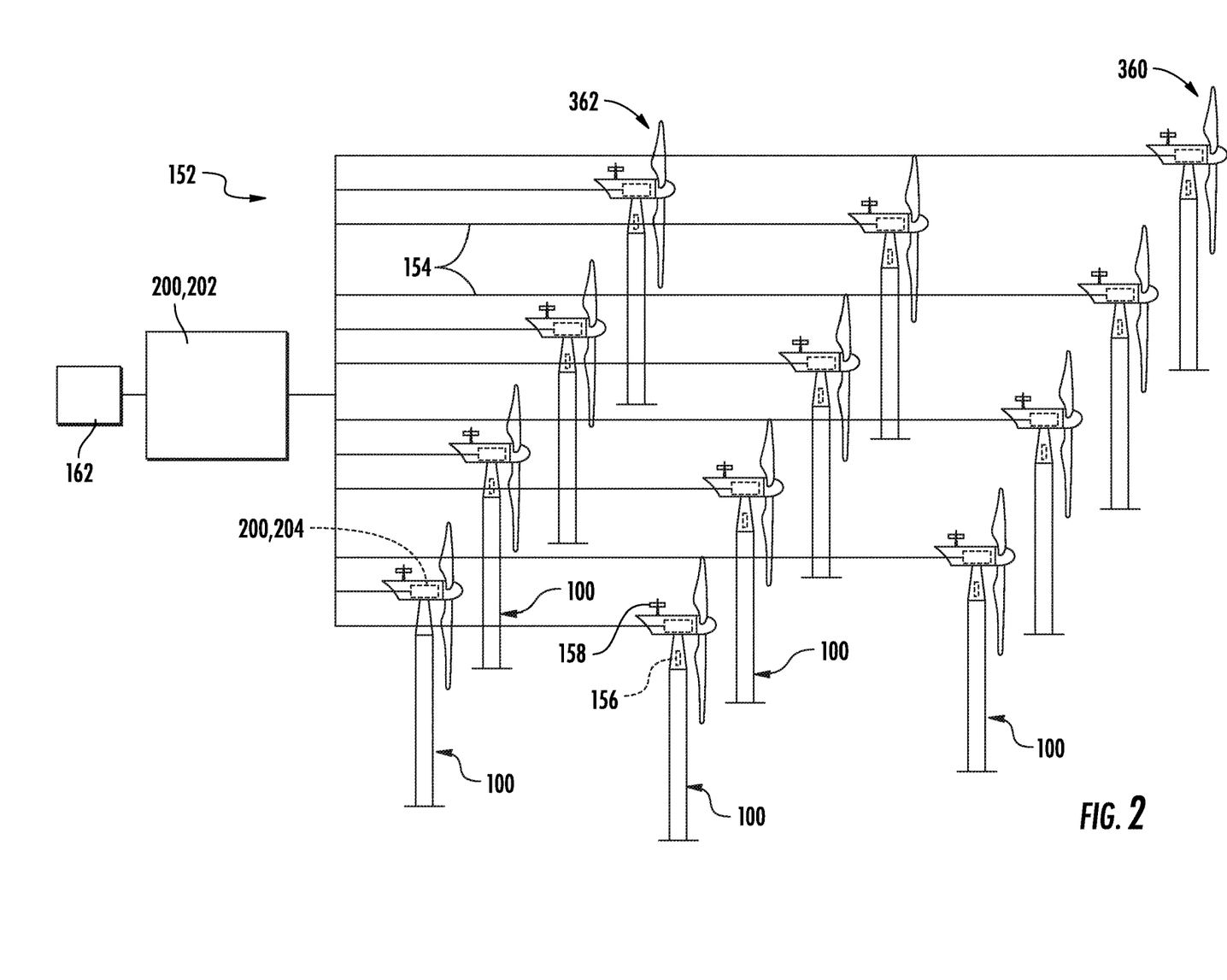
FIG. 2 illustrates a schematic diagram of one embodiment of a wind farm having a plurality of wind turbines according to the present disclosure.

Referring now to FIG. 2, a schematic view of a wind farm 152 controlled according to the system and method of the present disclosure is illustrated. As shown, in an embodiment, the wind farm 152 may include a plurality of wind turbines 100 described herein and a controller 200. The controller 200 may be configured as a farm controller 202. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the turbine controller(s) 204 of the wind turbine(s) 100 may be communicatively coupled to the farm controller 202 through a wired connection, such as by connecting the controller(s) 200 through suitable communicative links 154 (e.g., a suitable cable). Alternatively, the controller(s) 200 may be communicatively coupled to the farm controller 202 through a wireless connection, such as by using any suitable wireless communications protocol known in the art. In addition, the farm controller 202 may be generally configured similar to the controller 200 for each of the individual wind turbines 100 within the wind farm 152.

In an embodiment, the farm controller 202 may also be operably coupled to at least one output sensor 162 at a point of interconnect with the power grid. The output sensor(s) 162 may be configured to monitor the output of the wind farm 152 in order to detect indications of output flicker in the output.

Figure 3:
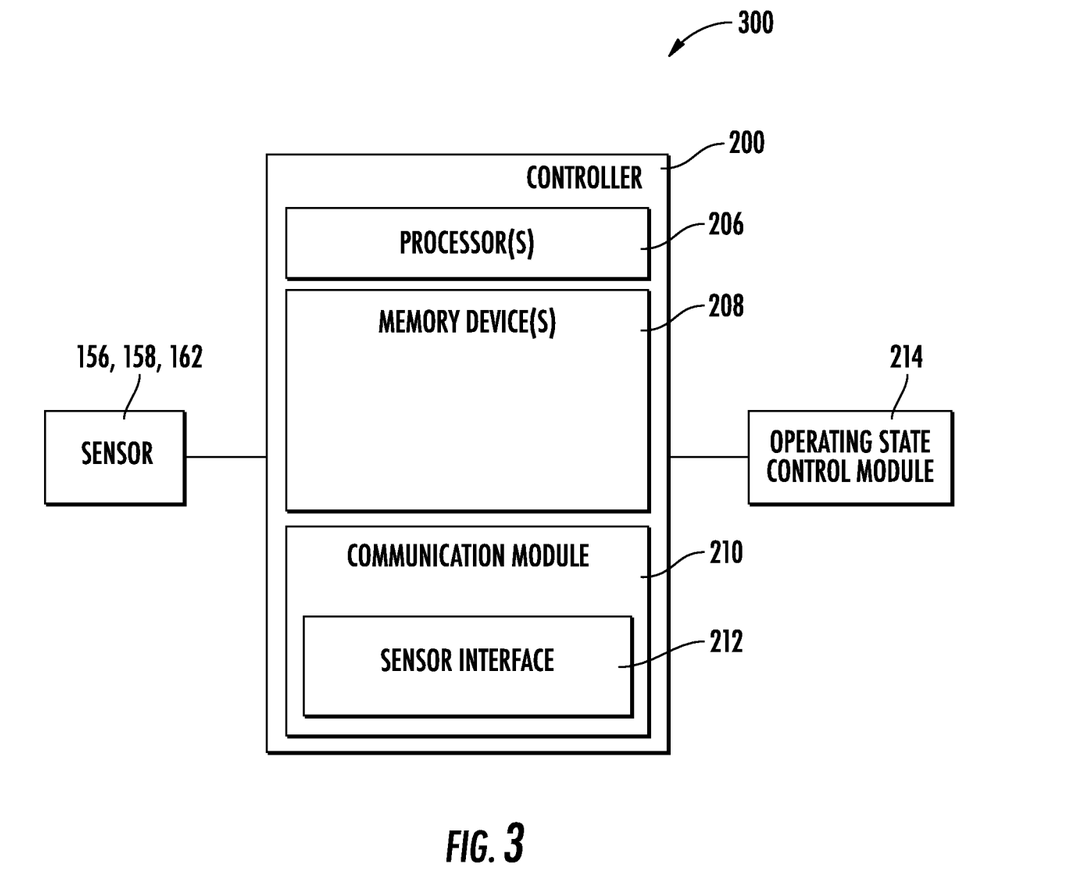
FIG. 3 illustrates a schematic diagram of one embodiment of a controller for use with the wind farm as shown in FIG. 2 according to the present disclosure.
Figure 4:
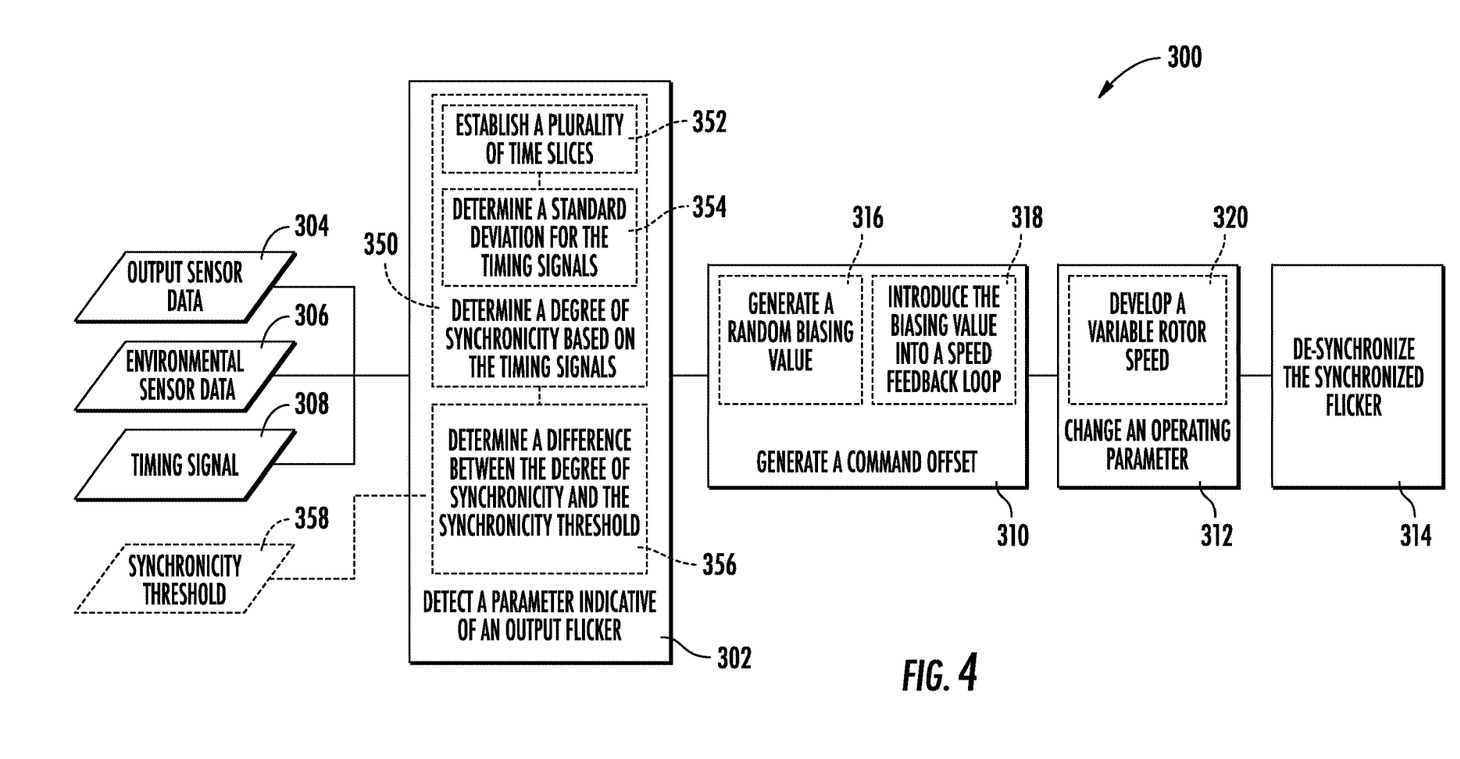
FIG. 4 illustrates a flow diagram of one embodiment of a control logic of a system for operating a wind farm according to the present disclosure.
Figure 5:
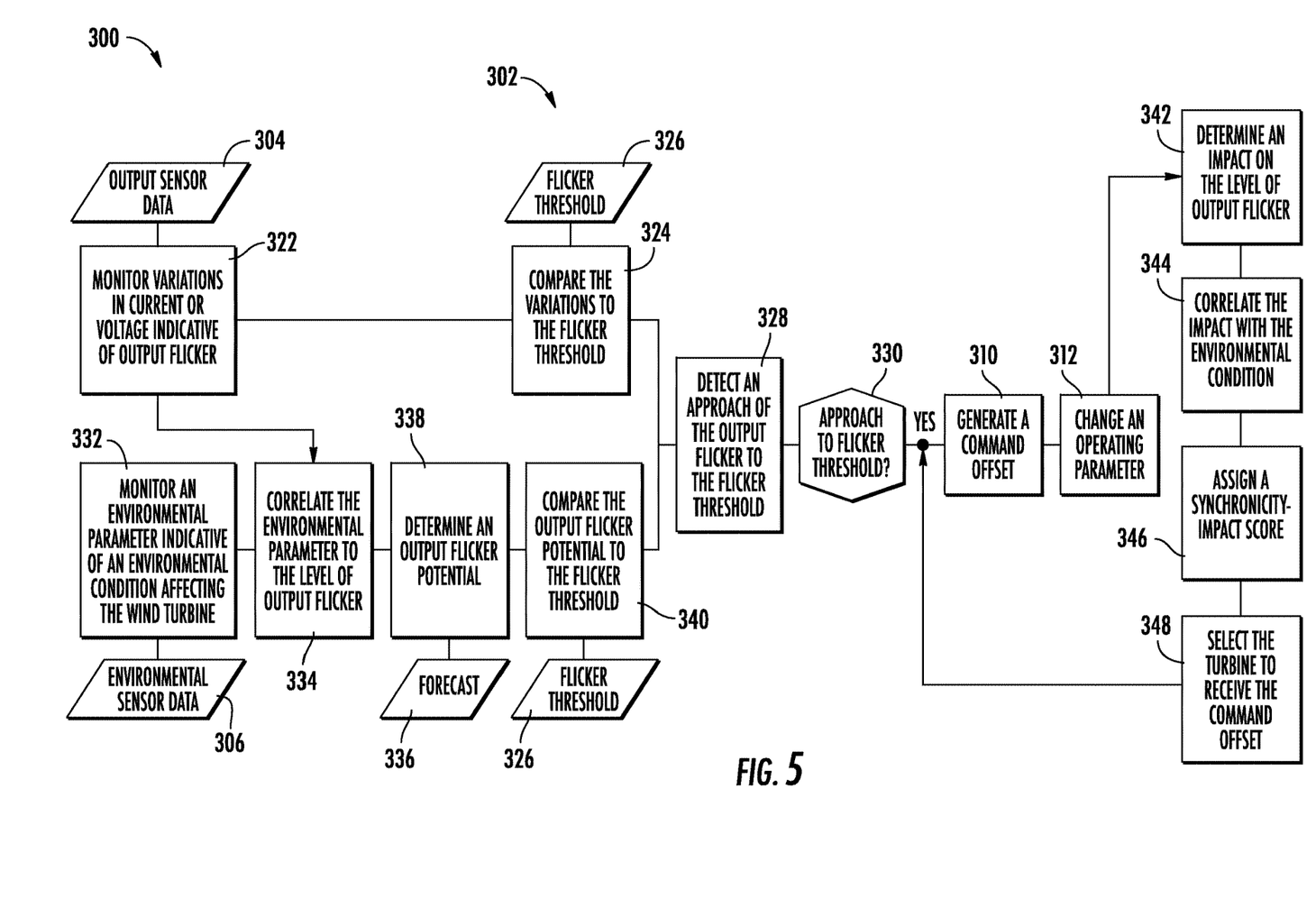
FIG. 5 illustrates a portion of the control logic of FIG. 4 according to the present disclosure.

Referring now to FIGS. 3-5, schematic diagrams of multiple embodiments of a system 300 for managing flicker generated by the wind farm 152 according to the present disclosure are presented. As shown particularly in FIG. 3, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the various components of the wind turbines 100. Further, the communications module 210 may include a sensor interface 212 (e.g., one or more analog-to-digital converters) to permit signals transmitted from one or more sensors 156, 158, 162 to be converted into signals that can be understood and processed by the processors 206. It should be appreciated that the sensors 156, 158, 162 may be communicatively coupled to the communications module 210 using any suitable means. For example, as shown in FIG. 3, the sensors 156, 158, 162 are coupled to the sensor interface 212 via a wired connection. However, in other embodiments, the sensors 156, 158, 162 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state/operating parameter.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting at least one parameter indicative of an output flicker, generating a command offset for a wind turbine, and changing an operating parameter of the wind turbine based on the command offset in order to de-synchronize the synchronized flicker in the output signals of the wind turbines, as described herein, as well as various other suitable computer-implemented functions.

Referring particularly to FIG. 4, in an embodiment, the farm controller 202 of the system 300 may be configured to detect at least one parameter 302 of the wind farm 152 indicative of an output flicker occurring in the power grid and generated by at least two of the wind turbines 100. In an embodiment, the parameter(s) 302 may be indicated by output sensor data 304, the environmental sensor data 306, and/or a timing signal 308. In an embodiment, the parameter(s) 302 may include measurements of the flicker in the output of the wind farm 152 as indicated by variations in current and/or voltage, which may be indicative of synchronized flicker. In an additional embodiment, the parameter(s) 302 may include data indicative of an environmental condition affecting the wind turbines 100. In a further embodiment, the parameter(s) 302 may include rotor positions of the rotors 108 of the wind turbines 100 as indicated by the timing signal 308. Additionally, in an embodiment, the parameter(s) 302 may be a learned wind turbine behavior wherein historical environmental conditions that resulted in flicker may be correlated to determine an output flicker potential corresponding to a weather forecast. In yet a further embodiment, the parameter(s) 302 may correspond to an operational state of the wind farm. For example, in an embodiment, the presence of synchronized flicker may be presumed whenever the wind farm 152 is in operation and, therefore, the control logic of the system 300 may be utilized to de-synchronize the output of each wind turbine 100 of the wind farm 152.

Figure 6:
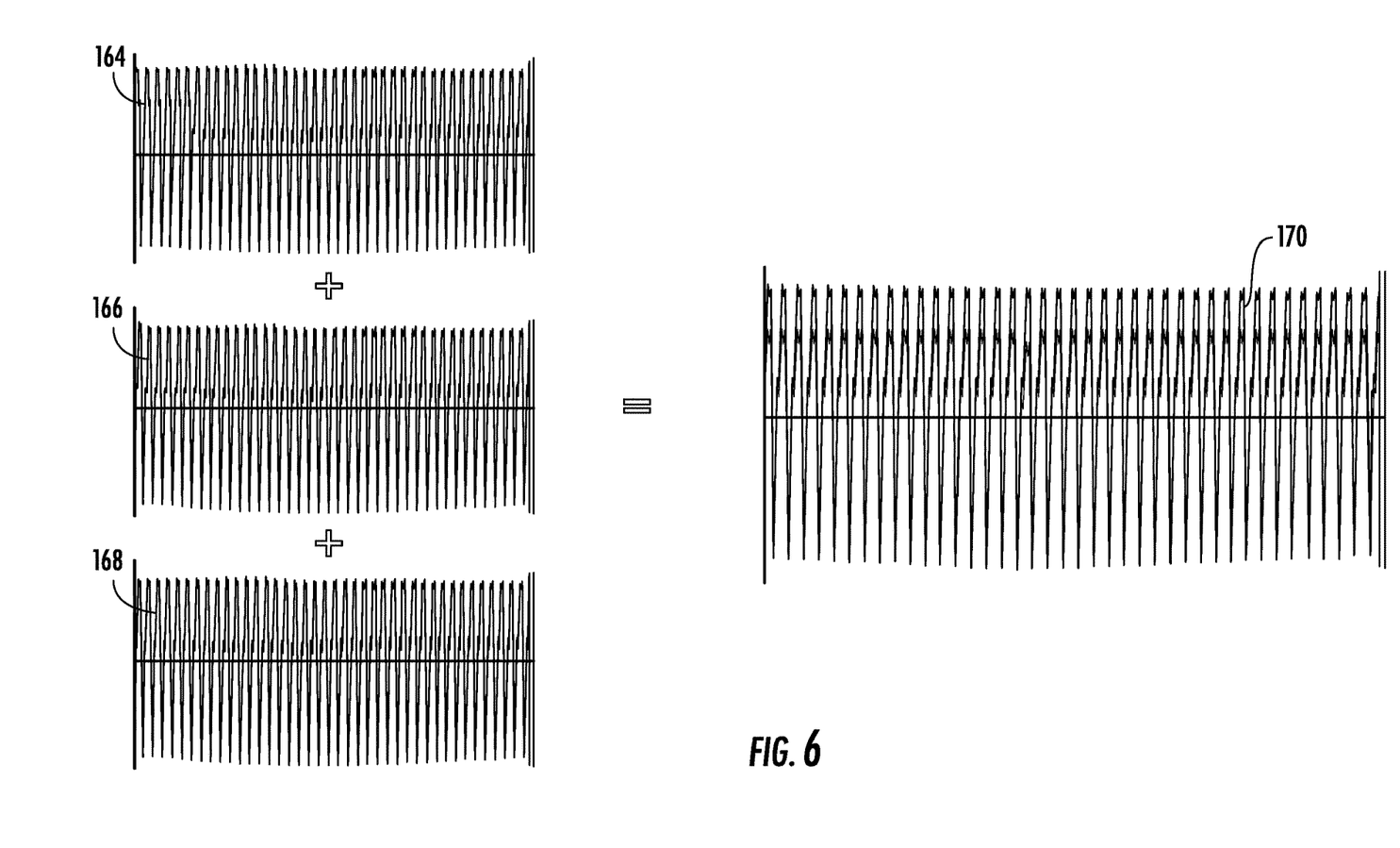
FIG. 6 illustrates a graphical representation of an output of the wind farm, particularly illustrating synchronized flicker according to the present disclosure.
Figure 7:
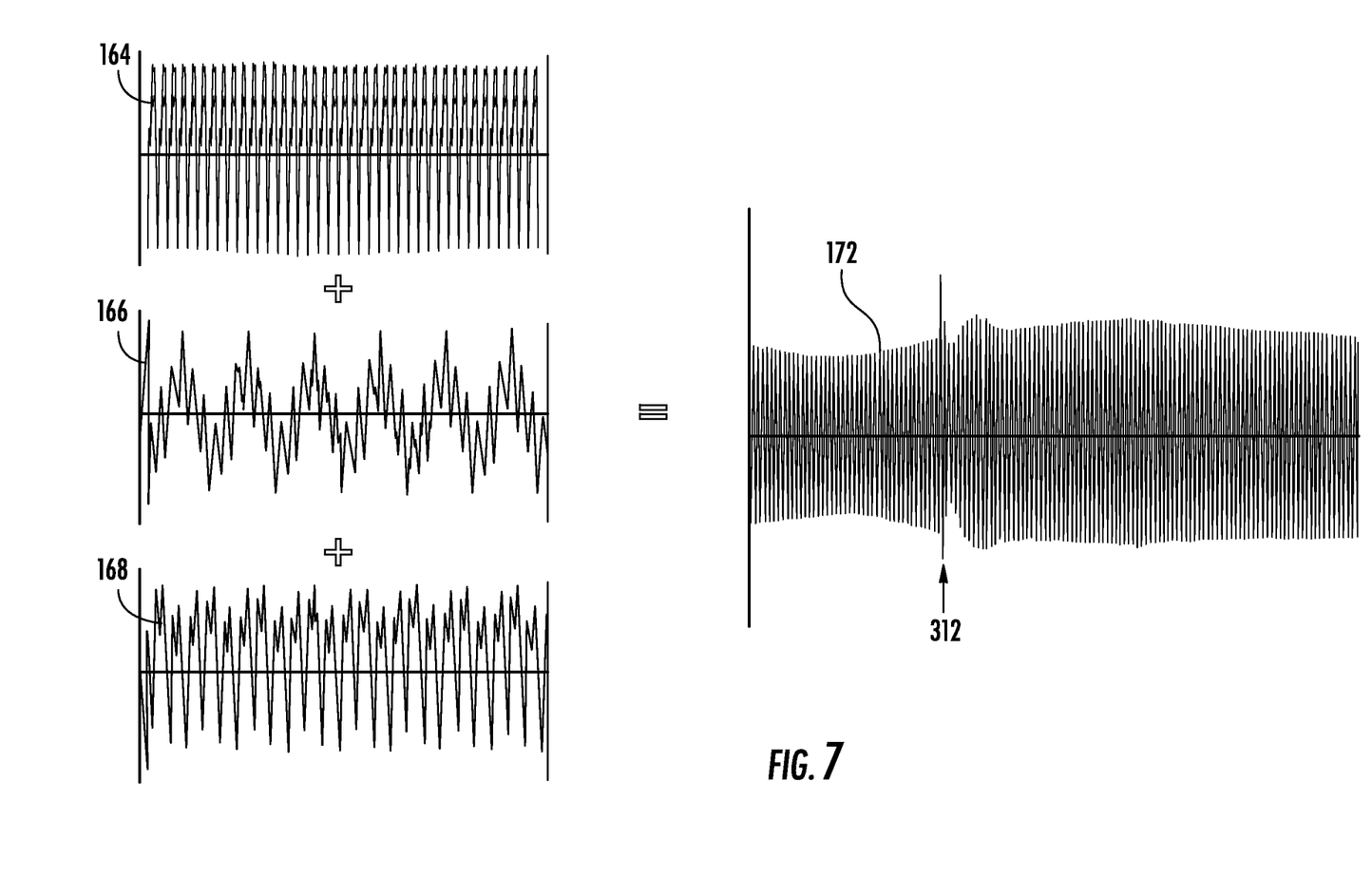
FIG. 7 illustrates a graphical representation of an output of the wind farm, particularly illustrating the de-synchronization of synchronized flicker according to the present disclosure.

It should be appreciated that the flicker generated by the wind farm 152 maybe the result of the synchronization of flicker present in the output of at least a portion of the plurality of wind turbines 100 of the wind farm 152. For example, FIG. 6 depicts an embodiment wherein the output signal of a first wind turbine 164, a second wind turbine 166, and a third wind turbine 168 may be characterized by frequency and amplitude variations in current/voltage, which may be synchronized. In such an embodiment, when the outputs of the three wind turbines 100 are combined at the POI, the resultant output of the wind farm 152 may reflect the combined, synchronized flicker of the wind turbines 100, as indicated by the plot 170. In an embodiment, plot 170, may reflect flicker in the output of the wind farm 152 as seen by the power grid, and which may be delivered to a power grid consumer. However, as depicted by FIG. 7, in an embodiment, the system 300 may be employed to change an operating parameter of at least one wind turbine 100 in order to de-synchronize the synchronized flicker in the output signals. For example due to the changing of an operating parameter, the output signals of the first, second, and third wind turbines 164, 166, 168 may be characterized by frequency and amplitude variations in current/voltage which are de-synchronized relative to one another as depicted in FIG. 7. The combination of the de-synchronized output signals may result in an output signal of the wind farm 152 having an absence of flicker as depicted by plot 172.

It should be further appreciated that being de-synchronized, the frequency and amplitude variations (e.g., flicker) in the output signal of a wind turbine 100 may be essentially masked by the frequency and amplitude variations in the output signal of another wind turbine 100 of the wind farm 152. Therefore, while flicker may, in an embodiment, be detectable in the outputs of the individual wind turbines 100, the combination of the de-synchronized outputs, as reflected by the output of the wind farm 152, may be a stable/constant output as perceived by a power grid consumer.

Referring again to FIG. 4, in an embodiment, the farm controller 202 of the system 300 may be configured to generate a command offset 310 for at least one wind turbine 100 upon detecting the parameter(s) 302 indicative of the synchronized flicker of the outputs of at least two wind turbines 100. The command offset 310 may facilitate the de-synchronization of the synchronized flicker in order to develop a wind farm 152 output which does not demonstrate the characteristics of flicker.

In an embodiment, the command offset may, at 312, be employed by the system 300 to change an operating parameter of the wind turbine(s) 100 so as to de-synchronize the synchronized flicker in the output signals of the at least two wind turbines at 314. In an embodiment, changing the operating parameter of the wind turbine(s) 100 based on the command offset 310 may include changing an operating parameter corresponding to a generator torque, power output, rotors speed, and/or mechanical loading of the wind turbine(s) 100. For example, in an embodiment, the command offset may be merged with a setpoint command for the wind turbine(s) 100 to generate a modified setpoint command. The modified setpoint command may, in an embodiment, be transmitted to the wind turbine(s) 100 in order to adjust the operating state of the wind turbine(s) 100. In an embodiment, the system 300 may follow the transmission of the modified setpoint command with the transmission of an unmodified setpoint command thereby returning the wind turbine(s) 100 to the original operating state but without the previously detected synchronized flicker. For instance, in an embodiment, the torque set point of the generator may be temporarily increased, resulting in an alteration of the frequency and/or amplitude of variations in the output current/voltage of the wind turbine(s) 100, before returning to a previous established optimal torque setpoint for the given operating state of the wind turbine(s) 100.

In an embodiment, generating the command offset 310 may include the generation of a random biasing value 316 by the farm controller 202. In such embodiments, the random biasing value 316 may be a random value introduced into a control logic of the wind turbine(s) 100 to temporarily bias a setpoint of the wind turbine(s) 100. For example, as shown at 318, in an embodiment, the farm controller 202 may be configured to introduce the biasing value 316 into a speed feedback loop of the turbine controller(s) 204 of the wind turbine(s) 100 to develop a variable rotor speed 320 for the wind turbine(s) 100. In an embodiment, the random biasing value 316 may include different variables introduced to different wind turbines 100 of the wind farm 152. In an additional embodiment, the random biasing value 316 may be a single value introduced to a random selection of wind turbines 100 of the wind farm 152 at a first instant, and a different random selection of wind turbines 100 at a second instant.

In an embodiment, as depicted in FIG. 5, the farm controller 202 of the system 300 may be configured to receive output sensor data 304 from the output sensor(s) 162. Accordingly, the output sensor(s) 162 may, at 322, be utilized to monitor the frequency and amplitude of variations in current and/or voltage of the output of the wind farm 152 at the POI. In an embodiment, the frequency and/or amplitude of the variations in the output of the wind farm 152 may be indicative of the synchronization of the flicker present in the output of various wind turbines 100 of the wind farm 152. As depicted at 324, in an embodiment, the farm controller 202 may compare the monitored variations in current and/or voltage to a flicker threshold 326. Accordingly, the farm controller 202 may, at 328, detect an approach of the output of the output sensor(s) 162 to the flicker threshold 326 for the wind farm 152. In an embodiment wherein the farm controller 202 determines, at 330, a level of flicker which approaches or exceeds the flicker threshold 326, the farm controller 202 may generate the command offset 310.

In an embodiment, detecting the parameter(s) 302 indicative of output flicker may include monitoring environmental sensor data 306. The environmental sensor data 306 may be at least one environmental parameter 332 indicative of an environmental condition affecting the wind farm 152. In an embodiment, the farm controller 202 may, at 334, correlate the environmental parameter(s) 332 to an indication of a level of output flicker. For example, the farm controller 202 may, in an embodiment, correlate the environmental parameter(s) 332 to the level of output flicker detected by the output sensor(s) 162 at the monitored environmental condition.

In an embodiment, the correlation of the environmental conditions to the level of output flicker may be accomplished over a specified period in order to establish a historical data set of correlations based on the observed relationship between the environmental conditions and the resultant level of output flicker. Accordingly, in an embodiment, the farm controller 202 of the system 300 may be configured to receive an environmental condition forecast 336. Based at least in part on the environmental condition forecast 336 and the correlation between the environmental parameter(s) 332/level of output flicker correlation, the farm controller 202 may determine an output flicker potential 338. It should be appreciated that the output flicker potential 338 may represent the degree of synchronized flicker which may be anticipated when the wind farm is affected by the forecasted environmental conditions.

As depicted at 340, in an embodiment, the farm controller 202 may be configured to compare the output flicker potential 338 to the flicker threshold 326 in order to detect, at 328, an approach of the flicker potential 338 to the flicker threshold 326. In an embodiment wherein the output flicker potential 338 approaches or exceeds the flicker threshold 326 for the wind farm 152, the farm controller 202 may generate the command offset 310. For example, the farm controller 202 may receive a weather forecast and may determine the anticipated level of output flicker under the forecast conditions. This anticipated level may, in an embodiment, be compared to the flicker threshold 326. When the anticipated level of output flicker meets or exceeds the flicker threshold 326, the farm controller 202 may prospectively generate the command offset 310 so as to preclude the development of an unacceptable level of output flicker in the output of the wind farm 152. Accordingly, it should be appreciated that the farm controller 202 may, in an embodiment generate the command offset 310 when the output flicker potential 338 and/or the output of the output sensor(s) 162 approaches or exceeds the flicker threshold 326 for the wind farm 152.

In an embodiment, the farm controller 202 of the system 300 may be configured to execute a feedback loop wherein the de-synchronization efficacy of the various wind turbines 100 of the wind farm 152 may be determined for various environmental conditions. Accordingly, the farm controller 202 may determine an impact 342 on the level of output flicker resulting from the changing of the operating parameter, at 312, of the wind turbine(s) 100 based on the command offset 310. As depicted at 344, the farm controller 202 may correlate the impact 342 with the environmental condition affecting the wind turbine 152 as indicated by the environmental parameter(s) 332. In an embodiment, the farm controller 202 may assign a synchronicity-impact score 346 to the wind turbine(s) 100 based on the computed correlation for the detected environmental condition. Based, at least partially, on the synchronicity-impact score 346, the farm controller 202 may, at 348, select the wind turbine(s) 100 from the plurality of wind turbines 100 to receive the command offset 310. In an embodiment, the feedback loop may be executed each time the command offset 310 is generated in response to the detection of the parameter(s) 302 indicative of output flicker, over a specified number of command cycles, and/or a specified period. Accordingly, a historical data set of correlations between the environmental parameter(s) 332 (e.g., weather conditions) and the de-synchronization efficacy of the wind turbine(s) 100. It should be appreciated that the farm controller 202 may utilize the historical data set, at least in part, to select the wind turbine(s) 100 from the plurality of wind turbines 100 which may be most effective at de-synchronizing the synchronized flicker output either prospectively or reactively.

In an embodiment, the detection of the parameter(s) 302 indicative of the output flicker may be based, at least in part, on the rotor positions of at least two wind turbines 100. As such, in an embodiment, the farm controller 202 of the system 300 may be configured to receive a timing signal 308 from at least two wind turbines 100 of the wind farm 152. The timing signal 308 may be indicative of the rotor position for the rotors 108 for each of the wind turbines 100. For example, the rotor position may indicate that a rotor blade 112 of each respective rotor 108 may be passing the tower 102 at the same instant, thereby indicating that the rotation of the respective rotors 108 may be synchronized. Based on the respective timing signals 108, the farm controller 202 may, in an embodiment, determine a degree of synchronicity 350 amongst the wind turbines 100.

It should be appreciated that in an embodiment, the at least two wind turbines 100 may be at least a first sub-grouping 360 of wind turbines 100 and a second sub-grouping 362 of wind turbines 100. In such an embodiment, the timing signals 308 of the individual wind turbines 100 of the respective sub-groupings 360, 362 may be consolidated into a single timing signal 308 for each of the sub-groupings 360, 362. Accordingly, in an embodiment, the timing signals 308 received by the farm controller 202 may correspond to a consolidated timing signal for the first sub-grouping 360 and a consolidated timing signal for the second sub-grouping 362.

In an embodiment, determining the degree of synchronicity 350, may include establishing a plurality of time slices 352 with the farm controller 202. The farm controller 202 may then determine a standard deviation 354 for the timing signal 308 across the time slices. The standard deviation 354 may be indicative of the degree of synchronicity 350 amongst the wind turbines 100. It should be appreciated that the lower the standard deviation 354, the greater the degree of synchronicity 350 amongst the wind turbines 100, with the opposite being also true.

The farm controller 202 may, in an embodiment, determine, at 356, a difference between the degree of synchronicity 350 and a synchronicity threshold 358. The synchronicity threshold 358 may correspond to the flicker threshold 326 such that an approach to the synchronicity threshold 358 may indicate an approach to the output flicker in the output of the wind farm 152 to the flicker threshold 326. It should be appreciated that the utilization of the degree of synchronicity 350 to detect an approach of the level of flicker to the flicker threshold 326 may preclude the requirement to monitor the output of the wind farm 152 and/or the environmental parameter(s) 332, or may be employed in conjunction with the monitoring of the output and/or the environmental parameter(s) 332.

It should be appreciated that the various embodiments disclosed herein relating to the detection of the parameter(s) 302 indicative of the output flicker, the generation of the command offset 310, and the changing of an operating parameter may be combined in various combinations and/or employed individually to facilitate the managing of flicker in the output of the wind farm 152 by the system 300.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for managing output flicker of a wind farm connected to a power grid, the wind farm comprising a plurality of wind turbines, the method comprising: detecting, with a farm controller of the wind farm, at least one parameter of the wind farm indicative of output flicker resulting from a synchronized flicker from at least two wind turbines of the plurality of wind turbines, the output flicker occurring in the power grid; upon detecting the at least one parameter, generating a command offset for at least one wind turbine of the at least two wind turbines; and changing an operating parameter of the at least one wind turbine based on the command offset so as to de-synchronize the synchronized flicker in output signals of the at least two wind turbines.

Clause 2. The method of claim 1, wherein generating the command offset comprises: generating a random biasing value; and introducing the random biasing value into a control loop of at least one wind turbine.

Clause 3. The method of any preceding clause, wherein changing the operating parameter of the at least one wind turbine comprises: introducing the random biasing value into a speed feedback loop of a turbine controller to develop a variable rotor speed for the at least one wind turbine.

Clause 4. The method of any preceding clause, wherein the wind farm further comprises at least one output sensor operably coupled to the farm controller at a point of interconnect with the power grid, and wherein detecting the at least one parameter indicative of output flicker further comprises: monitoring, via the at least one output sensor, a frequency and amplitude of variations in current or voltage of an output of the wind farm at the point of interconnect with the power grid, wherein the frequency and amplitude of the variations are indicative of the synchronized flicker; and detecting, with the farm controller, an approach of the output to a flicker threshold for the wind farm.

Clause 5. The method of any preceding clause, wherein the wind farm further comprises at least one environmental sensor operably coupled to the farm controller, and wherein detecting the at least one parameter indicative of the output flicker further comprises: monitoring, via the at least one environmental sensor, at least one environmental parameter indicative of an environmental condition affecting the wind farm; and correlating, with the farm controller, the at least one environmental parameter to a level of output flicker as detected by the at least one output sensor at the monitored environmental condition.

Clause 6. The method of any preceding clause, further comprising: determining, with the farm controller, an output flicker potential for the wind farm based at least in part on the correlation and a forecasted environmental condition.

Clause 7. The method of any preceding clause, wherein generating the command offset further comprises generating the command offset when at least one of the output flicker potential or the output of the wind farm approaches or exceeds the flicker threshold for the wind farm.

Clause 8. The method of any preceding clause, further comprising: determining an impact on the level of the out flicker resulting from the changing of the operating parameter of the at least one wind turbine based on the command offset; correlating, with the farm controller, the impact with the environmental condition affecting the wind farm; assigning a synchronicity-impact score to the at least one wind turbine based on the computed correlation for the detected environmental condition; and selecting the at least one wind turbine from the plurality of wind turbines to receive the command offset based, at least partially, on the synchronicity-impact score.

Clause 9. The method of any preceding clause, wherein detecting the at least one parameter indicative of the output flicker further comprises: receiving, with the farm controller, a timing signal from the at least two wind turbines, the timing signal being indicative of a rotor position for each of the wind turbines; determining, with the farm controller, a degree of synchronicity amongst the at least two wind turbines of the plurality of wind turbines based on the respective timing signals; and determining, with the farm controller, a difference between the degree of synchronicity and a synchronicity threshold corresponding to a synchronized flicker threshold.

Clause 10. The method of any preceding clause, wherein determining the degree of synchronicity amongst the at least two wind turbines of the plurality of wind turbines further comprises: establishing, with the farm controller, a plurality of time slices; and determining, with the farm controller, a standard deviation for the timing signals across the time slices, wherein the standard deviation for the timing signals is indicative of the degree of synchronicity amongst the plurality of wind turbines.

Clause 11. The method of any preceding clause, wherein the at least two wind turbines of the plurality of wind turbines comprises at least a first sub-grouping of wind turbines and a second sub-grouping of wind turbines, and wherein the respective timing signals are indicative of a combined timing of the wind turbines comprising the first sub-grouping and a combined timing of the wind turbines comprising the second sub-grouping of wind turbines.

Clause 12. The method of any preceding clause, wherein changing the operating parameter of the at least one wind turbine based on the command offset further comprises changing the operating parameter corresponding to at least one of generator torque, power output, rotor speed, or mechanical loading of the wind turbine.

Clause 13. A system for managing output flicker generated by a wind farm, the system comprising: a plurality of wind turbines coupled to an electrical grid; and a fam controller communicatively coupled to the plurality of wind turbines and to the power grid, the farm controller comprising at least one processor configured to perform a plurality of operations, the plurality of operations comprising: detecting at least one parameter of the wind farm indicative of a synchronized flicker from at least two wind turbines of the plurality of wind turbines, the synchronized flicker occurring in the power grid, upon detecting the at least one parameter, generating a command offset for at least one wind turbine of the at least two wind turbines, and changing an operating parameter of the at least one wind turbine based on the command offset so as to de-synchronize the synchronized flicker in output signals of the at least two wind turbines.

Clause 14. The system of any preceding clause, wherein changing the operating parameter of the at least one wind turbine comprises: introducing a random biasing value into a speed feedback loop of a turbine controller to develop a variable rotor speed for the at least one wind turbine.

Clause 15. The system of any preceding clause, wherein the wind farm further comprises at least one output sensor operably coupled to the farm controller at a point of interconnect with the power grid, and wherein detecting the at least one parameter indicative of the output flicker further comprises: monitoring, via the at least one output sensor, a frequency and amplitude of variations in current or voltage of an output of the wind farm at the point of interconnect with the power grid, wherein the frequency and amplitude of the variations are indicative of the synchronized flicker; and detecting, with the farm controller, an approach of the output to a flicker threshold for the wind farm.

Clause 16. The system of any preceding clause, wherein the wind farm further comprises at least one environmental sensor operably coupled to the farm controller, and wherein detecting the at least one parameter indicative of the output flicker further comprises: monitoring, via the at least one environmental sensor, at least one environmental parameter indicative of an environmental condition affecting the wind farm; and correlating, with the farm controller, the at least one environmental parameter to a level of output flicker as detected by the at least one output sensor at the monitored environmental condition.

Clause 17. The system of any preceding clause, further comprising: determining an output flicker potential for the wind farm based at least in part on the correlation and a forecasted environmental condition.

Clause 18. The system of any preceding clause, wherein generating the command offset further comprises generating the command offset when at least one of the output flicker potential or the output of the wind farm approaches or exceeds the flicker threshold for the wind farm.

Clause 19. The system of any preceding clause, further comprising: determining an impact on the level of output flicker resulting from the changing of the operating parameter of the at least one wind turbine based on the command offset; correlating the impact with the environmental condition affecting the wind farm; assigning a synchronicity-impact score to the at least one wind turbine based on the computed correlation for the detected environmental condition; and selecting the at least one wind turbine from the plurality of wind turbines to receive the command offset based, at least partially, on the synchronicity-impact score.

Clause 20. The system of any preceding clause, wherein detecting the at least one parameter indicative of the output flicker further comprises: receiving a timing signal from the at least two wind turbines, the timing signal being indicative of a rotor position for each of the wind turbines; establishing a plurality of time slices; determining a standard deviation for the timing signals across the time slices, wherein the standard deviation for the timing signals is indicative of a degree of synchronicity amongst the at least two wind turbines; and determining a difference between the degree of synchronicity and a synchronicity threshold corresponding to an output flicker threshold.

What is claimed is:

1. A method for managing output flicker of a wind farm connected to a power grid, the wind farm comprising a plurality of wind turbines, the method comprising:
   detecting, with a farm controller of the wind farm, at least one parameter of the wind farm indicative of output flicker resulting from a synchronized flicker from at least two wind turbines of the plurality of wind turbines, the output flicker occurring in the power grid, wherein detecting the at least one parameter indicative of the output flicker further comprises receiving, with the farm controller, a timing signal from the at least two wind turbines indicative of a rotor position of the at least two wind turbines, determining, with the farm controller, a degree of synchronicity amongst the at least two wind turbines based on the respective timing signals, and determining, with the farm controller, a difference between the degree of synchronicity and a synchronicity threshold;
   upon detecting the at least one parameter, generating a command offset for at least one wind turbine of the at least two wind turbines; and
   changing an operating parameter of the at least one wind turbine based on the command offset so as to desynchronize the synchronized flicker in output signals of the at least two wind turbines.

2. The method of claim 1, wherein generating the command offset comprises:
   generating a random biasing value; and
   introducing the random biasing value into a control loop of at least one wind turbine.

3. The method of claim 2, wherein changing the operating parameter of the at least one wind turbine comprises:
   introducing the random biasing value into a speed feedback loop of a turbine controller to develop a variable rotor speed for the at least one wind turbine.

4. The method of claim 1, wherein the wind farm further comprises at least one output sensor operably coupled to the farm controller at a point of interconnect with the power grid, and wherein detecting the at least one parameter indicative of output flicker further comprises:
   monitoring, via the at least one output sensor, a frequency and amplitude of variations in current or voltage of an output of the wind farm at the point of interconnect with the power grid, wherein the frequency and amplitude of the variations are indicative of the synchronized flicker; and
   detecting, with the farm controller, an approach of the output to a flicker threshold for the wind farm.

5. The method of claim 4, wherein the wind farm further comprises at least one environmental sensor operably coupled to the farm controller, and wherein detecting the at least one parameter indicative of the output flicker further comprises:
   monitoring, via the at least one environmental sensor, at least one environmental parameter indicative of an environmental condition affecting the wind farm; and
   correlating, with the farm controller, the at least one environmental parameter to a level of output flicker as detected by the at least one output sensor at the monitored environmental condition.

6. The method of claim 5, further comprising:
   determining, with the farm controller, an output flicker potential for the wind farm based at least in part on the correlation and a forecasted environmental condition.

7. The method of claim 6, wherein generating the command offset further comprises generating the command offset when at least one of the output flicker potential or the output of the wind farm approaches or exceeds the flicker threshold for the wind farm.

8. The method of claim 5, further comprising:
   determining an impact on the level of the out flicker resulting from the changing of the operating parameter of the at least one wind turbine based on the command offset;
   correlating, with the farm controller, the impact with the environmental condition affecting the wind farm;
   assigning a synchronicity impact score to the at least one wind turbine based on the computed correlation for the detected environmental condition; and
   selecting the at least one wind turbine from the plurality of wind turbines to receive the command offset based, at least partially, on the synchronicity impact score.

9. The method of claim 1, wherein determining the degree of synchronicity amongst the at least two wind turbines of the plurality of wind turbines further comprises:
   establishing, with the farm controller, a plurality of time slices; and
   determining, with the farm controller, a standard deviation for the timing signals across the time slices, wherein the standard deviation for the timing signals is indicative of the degree of synchronicity amongst the plurality of wind turbines.

10. The method of claim 1, wherein the at least two wind turbines of the plurality of wind turbines comprises at least a first sub grouping of wind turbines and a second sub grouping of wind turbines, and wherein the respective timing signals are indicative of a combined timing of the wind turbines comprising the first sub grouping and a combined timing of the wind turbines comprising the second sub grouping of wind turbines.

11. The method of claim 1, wherein changing the operating parameter of the at least one wind turbine based on the command offset further comprises changing the operating parameter corresponding to at least one of generator torque, power output, rotor speed, or mechanical loading of the wind turbine.

12. A system for managing output flicker generated by a wind farm, the system comprising:
   a plurality of wind turbines coupled to an electrical grid; and a farm controller communicatively coupled to the plurality of wind turbines and to the power grid, the farm controller comprising at least one processor configured to perform a plurality of operations, the plurality of operations comprising:

detecting at least one parameter of the wind farm indicative of a synchronized flicker from at least two wind turbines of the plurality of wind turbines, the synchronized flicker occurring in the power grid, wherein detecting the at least one parameter indicative of the output flicker further comprises receiving, with the farm controller, a timing signal from the at least two wind turbines indicative of a rotor position of the at least two wind turbines, determining, with the farm controller, a degree of synchronicity amongst the at least two wind turbines based on the respective timing signals, and determining, with the farm controller, a difference between the degree of synchronicity and a synchronicity threshold, upon detecting the at least one parameter, generating a command offset for at least one wind turbine of the at least two wind turbines, and changing an operating parameter of the at least one wind turbine based on the command offset so as to desynchronize the synchronized flicker in output signals of the at least two wind turbines.

13. The system of claim 12, wherein changing the operating parameter of the at least one wind turbine comprises:
introducing a random biasing value into a speed feedback loop of a turbine controller to develop a variable rotor speed for the at least one wind turbine.

14. The system of claim 12, wherein the wind farm further comprises at least one output sensor operably coupled to the farm controller at a point of interconnect with the power grid, and wherein detecting the at least one parameter indicative of the output flicker further comprises:
monitoring, via the at least one output sensor, a frequency and amplitude of variations in current or voltage of an output of the wind farm at the point of interconnect with the power grid, wherein the frequency and amplitude of the variations are indicative of the synchronized flicker; and
detecting, with the farm controller, an approach of the output to a flicker threshold for the wind farm.

15. The system of claim 14, wherein the wind farm further comprises at least one environmental sensor operably coupled to the farm controller, and wherein detecting the at least one parameter indicative of the output flicker further comprises:
monitoring, via the at least one environmental sensor, at least one environmental parameter indicative of an environmental condition affecting the wind farm; and
correlating, with the farm controller, the at least one environmental parameter to a level of output flicker as detected by the at least one output sensor at the monitored environmental condition.

16. The system of claim 15, further comprising:
determining an output flicker potential for the wind farm based at least in part on the correlation and a forecasted environmental condition.

17. The system of claim 16, wherein generating the command offset further comprises generating the command offset when at least one of the output flicker potential or the output of the wind farm approaches or exceeds the flicker threshold for the wind farm.

18. The system of claim 15, further comprising:
determining an impact on the level of output flicker resulting from the changing of the operating parameter of the at least one wind turbine based on the command offset;
correlating the impact with the environmental condition affecting the wind farm;
assigning a synchronicity impact score to the at least one wind turbine based on the computed correlation for the detected environmental condition; and
selecting the at least one wind turbine from the plurality of wind turbines to receive the command offset based, at least partially, on the synchronicity impact score.

* * * * *